United States Patent
VonThenen

(10) Patent No.: US 9,152,545 B1
(45) Date of Patent: Oct. 6, 2015

(54) READ-WRITE ACCESS IN A READ-ONLY ENVIRONMENT

(71) Applicant: EMC Corporation, Hopkinton, MA (US)

(72) Inventor: David VonThenen, Aliso Viejo, CA (US)

(73) Assignee: EMC CORPORATION, Hopkinton, MA (US)

( * ) Notice: Subject to any disclaimer, the term of this patent is extended or adjusted under 35 U.S.C. 154(b) by 269 days.

(21) Appl. No.: 13/966,065

(22) Filed: Aug. 13, 2013

Related U.S. Application Data

(60) Provisional application No. 61/812,679, filed on Apr. 16, 2013.

(51) Int. Cl.
*G06F 12/00* (2006.01)
*G06F 11/14* (2006.01)

(52) U.S. Cl.
CPC ............ *G06F 12/00* (2013.01); *G06F 11/1448* (2013.01); *G06F 11/1464* (2013.01)

(58) Field of Classification Search
CPC .. G06F 12/00; G06F 11/1448; G06F 11/1464
See application file for complete search history.

(56) References Cited

U.S. PATENT DOCUMENTS

| | | | |
|---|---|---|---|
| 8,065,479 B2 | 11/2011 | Humlicek | |
| 8,234,468 B1 * | 7/2012 | Deshmukh et al. | ........... 711/162 |
| 8,966,188 B1 | 2/2015 | Bardale | |
| 2013/0339301 A1 | 12/2013 | Saito et al. | |
| 2013/0339954 A1 | 12/2013 | Tsikrin | |
| 2015/0046401 A1 * | 2/2015 | Xing | .............................. 707/638 |
| 2015/0193350 A1 | 7/2015 | Zhu | |

OTHER PUBLICATIONS

U.S. Appl. No. 13/966,009, Jun. 10, 2015, US Office Action.
U.S. Appl. No. 13/966,163, Aug. 11, 2015, US Notice of Allowance.

* cited by examiner

*Primary Examiner* — John Lane
(74) *Attorney, Agent, or Firm* — Workman Nydegger

(57) ABSTRACT

In one example, a method for reading data, includes receiving a read request that is directed to a data object, where the read request includes both an offset and an end. Next, the data object is examined to determine if a previously written data block is present that has an offset which is the same as one of the offset or the end of the read request. If there is no previously written data block present which has the same offset or end as the read request, a previously written data block whose offset immediately precedes one of the offset or the end of the read request is then returned.

20 Claims, 8 Drawing Sheets

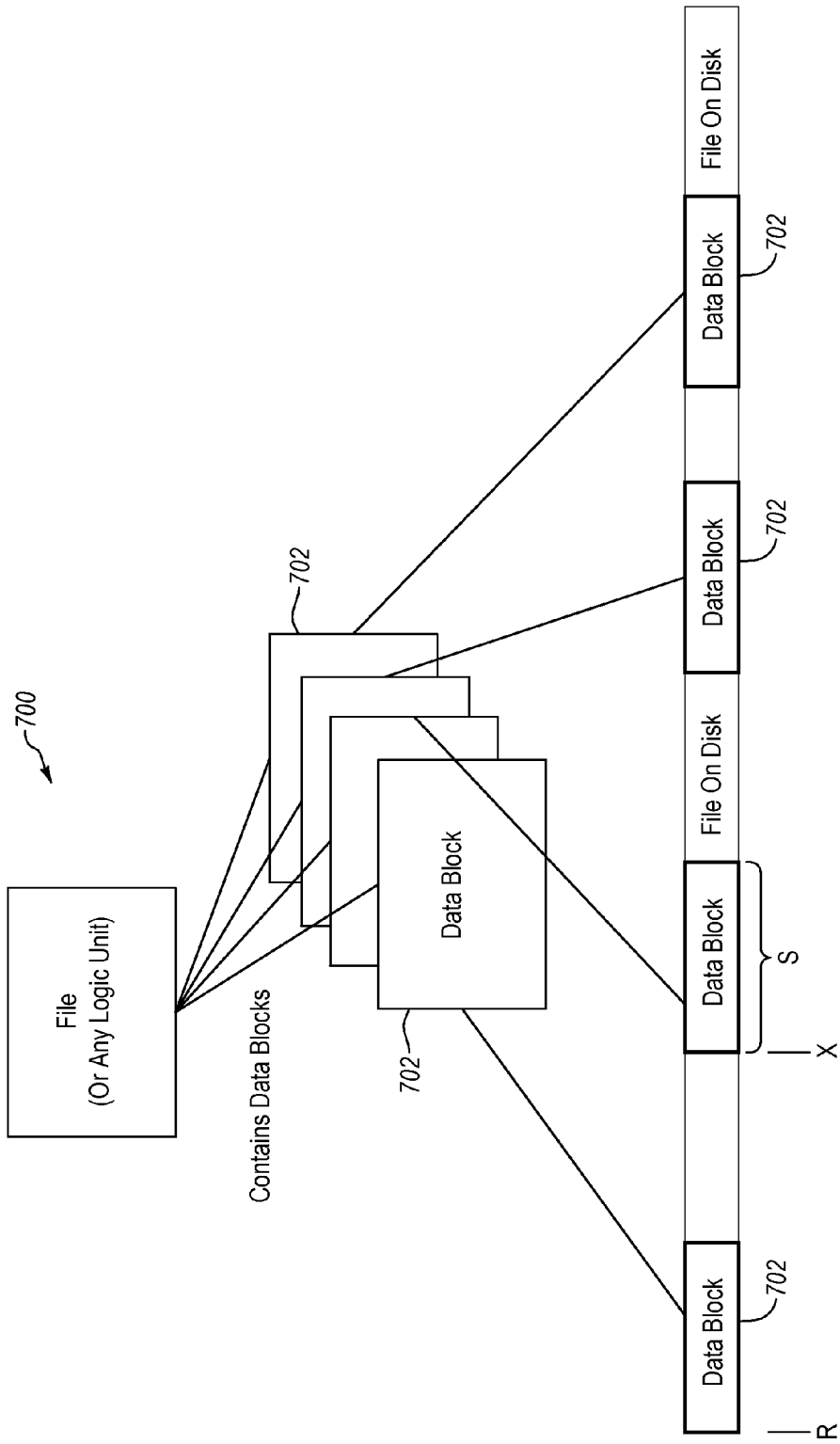

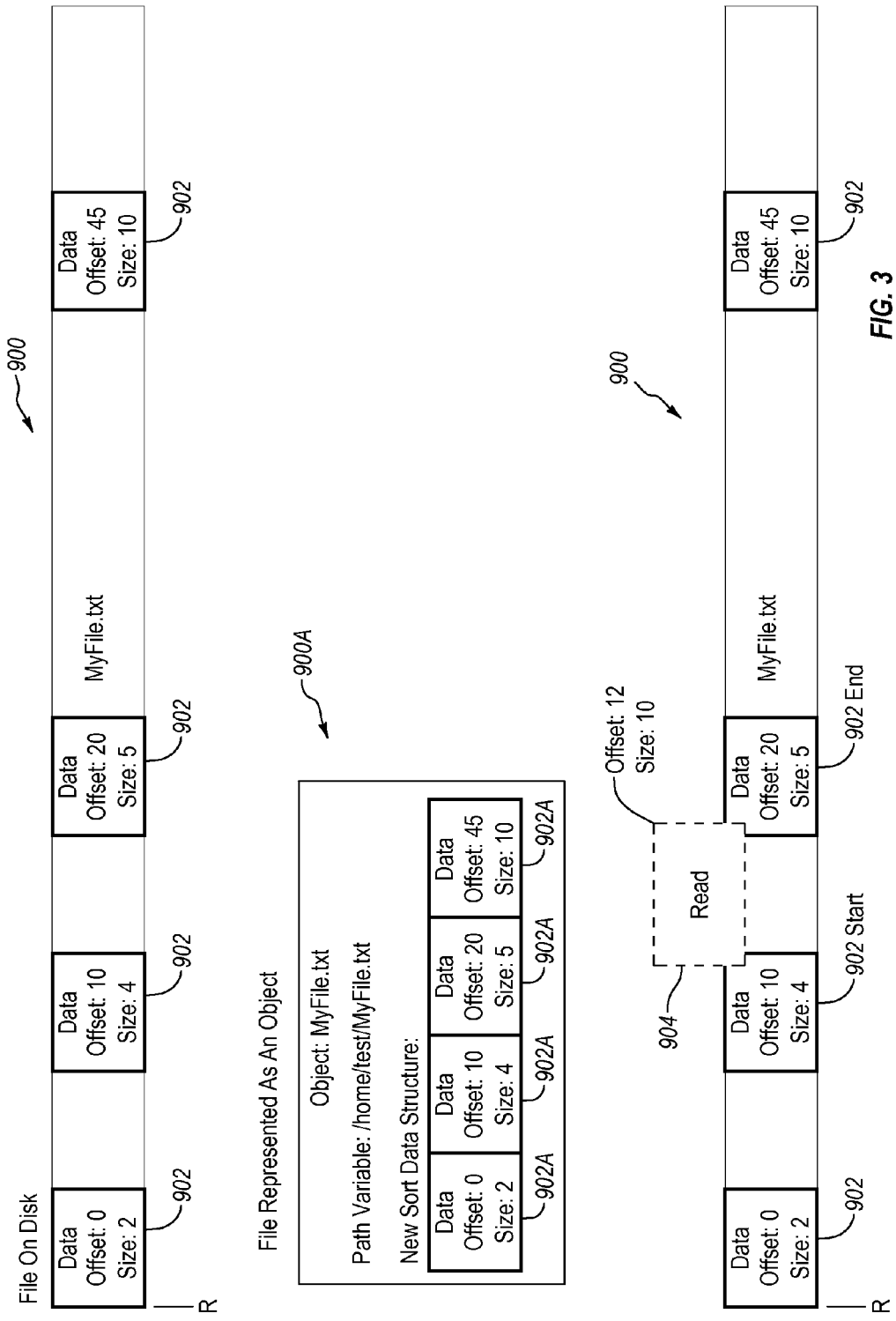

READ-WRITE ACCESS IN A READ-ONLY ENVIRONMENT

RELATED APPLICATIONS

This application claims priority to U.S. Provisional Patent Application Ser. No. 61/812,679, entitled READ WRITE ACCESS INA READ ONLY ENVIRONMENT, and filed on Apr. 16, 2013. As well, this application is related to: U.S. patent application Ser. No. 13/966,009, entitled READ-WRITE ACCESS IN A READ-ONLY ENVIRONMENT, and filed the same day herewith; and, to U.S. patent application Ser. No. 13/966,163, entitled READ-WRITE ACCESS IN A READ-ONLY ENVIRONMENT, and filed the same day herewith. All of the aforementioned applications are incorporated herein in their respective entireties by this reference.

FIELD OF THE INVENTION

Embodiments of the present invention relate to backing up data. More particularly, embodiments of the invention relate to systems, hardware, computer-readable media, and methods for reading and writing data in various environments.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up critical data so that in the event of a natural disaster, unauthorized access, or other events, the entity can recover any data that was compromised or lost.

Often, the backed up data is stored in a 'read only' format. However, some applications require not only read access to the backed up data, but also write access to the backed up data, that is, such applications require read-write access. Since the data is stored in a 'read only' format however, such applications are unable to perform the necessary write operations to that data.

In light of the foregoing, it would be useful to be able to provide read-write access to 'read only' data, such as backed up data for example, in such a way that the necessary read and write operations can be performed without modifying or compromising the 'read only' data in any material way. As well, it would be useful to be able to identify where a write operation occurred so that a determination can be made as to whether or not the written data contributes to a read request.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 2a discloses an example of a portion of a file on storage media;

FIG. 3 discloses an example embodiment of a representation of 'read only' data, as well as aspects of associated read and write processes.

DETAILED DESCRIPTION OF SOME EXAMPLE EMBODIMENTS

Figure 1A:
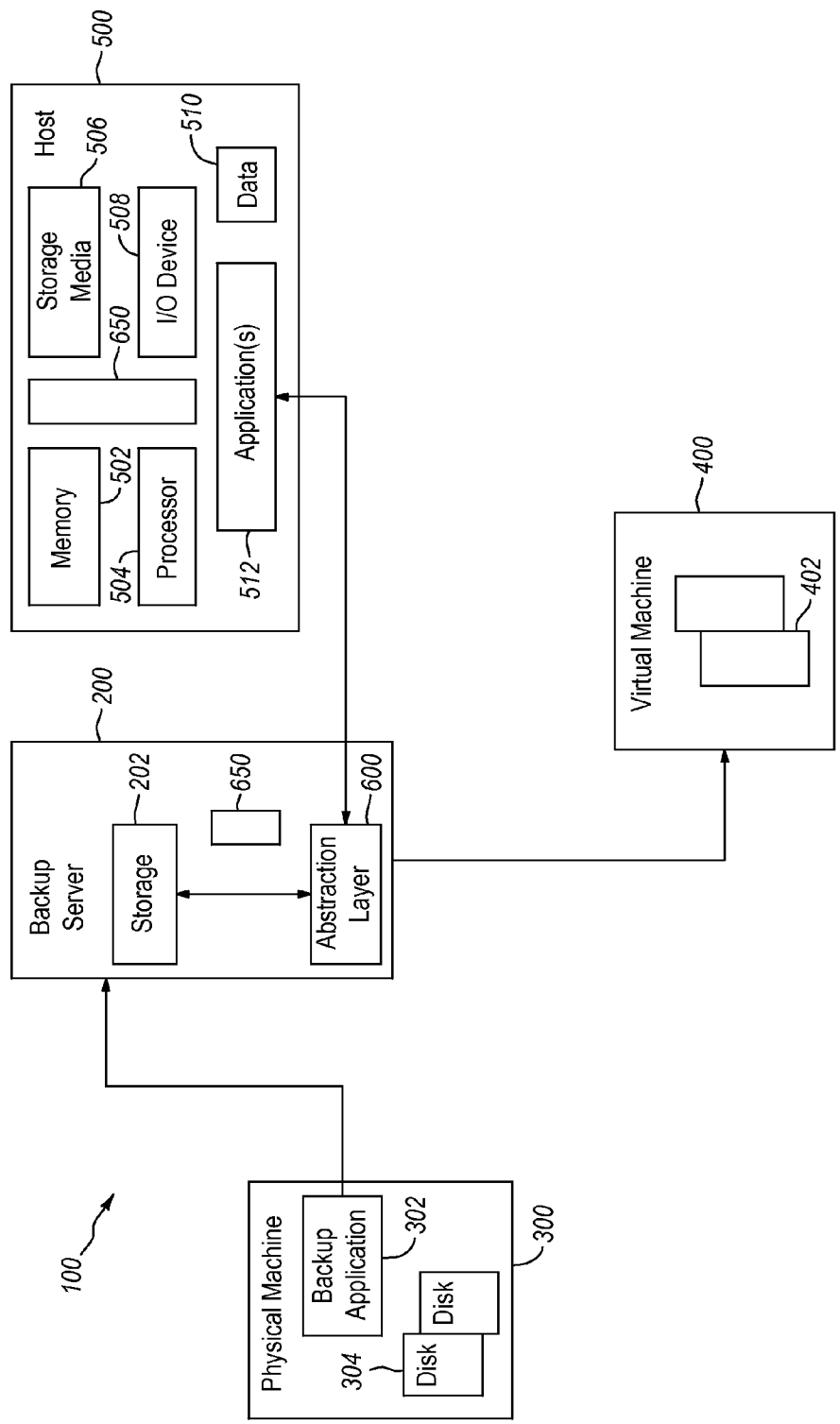
FIGS. 1a-1d are directed to different example environments and configurations of embodiments of the invention.

Embodiments of the present invention relate generally to recovering data for restoration to one or more targets. At least some embodiments are employed in an environment where backups are stored that can be restored to a target device or devices. More particular example embodiments of the invention relate to systems, hardware, computer-readable media and methods for defining and/or executing read and/or write processes with respect to backed up 'read only' data.

In at least some embodiments, an abstraction layer is provided that intercepts a write request directed to underlying 'read only' data. The abstraction layer can reside in any location where it is able to intercept write requests that are directed to 'read only' data which may be stored, for example, at one or more virtual machines. Such write requests can be issued by an application, and the 'read only' data may be backup data, although neither of these is required.

When the underlying data is read/written to, the abstraction layer can be instructed to either commit the data to underlying structure, that is, modify the underlying data, or dismiss the write data thereby leaving the underlying data unaltered. Since both the offsets and data for writes are known, the list of write data blocks can be walked and then written to the underlying data.

The abstraction layer operates in conjunction with a data structure, such as a balanced search tree for example, to which one or more blocks of an intercepted write request can be added, and which enables the added write blocks to be mapped for later use. In one implementation, the data structure includes the offset of a block to be written, as well as the size of that block. The payload of the block to be written may be stored remotely from the data structure. Each write block in the data structure is associated with an identifier, such as the offset for example, that uniquely identifies that particular block.

As well, each write block in the data structure is associated with a full file path that uniquely identifies a file object construct to which that block will be written. In general, the file object construct is a representation of the structure of the 'read only' data, and is stored in a hashmap in association with its unique full file path. When a 'read only' file is opened that is intended to be written to, the hashmap can retrieve the file object construct implicated by the write request and add the corresponding write blocks to the data structure.

When a read request is issued that corresponds to the file associated with the write request, the file object construct representing that file is looked up and the data structure is queried for write changes to the file object construct. More specifically, the query involves a determination as to whether or not a write occurred between the start and end of the read request. In this way, any data modified in connection with previous write requests, and implicated by the read request, can be identified, and then returned in response to the read request.

For example, if the offset of the read request corresponds to an offset of a data block in the file object construct, then that block, along with any subsequent data blocks, that is, data blocks with an offset greater than the offset of the read request, in the read request is returned. On the other hand, if the offset of the read request does not correspond to an offset of any of the blocks in the file object construct, then the data block immediately preceding the offset of the read request is returned. In at least some instances, the data block before the offset of the read request is automatically returned.

In any case, by returning the immediately preceding data block, the offset and size of that data block can be used to determine if the previous write overflows into the space attempting to be read and, if so, that immediately preceding block will be returned in response to the read request. In this way, the read request results in the return of all previously written data blocks that reside even partially within the offset and end of the read request.

As may be evident from the preceding discussion, and other disclosure herein, embodiments of the invention may provide various advantages, although it is not necessary, or required, that any particular embodiment(s), provide any particular advantage(s). Moreover, and consistent with the foregoing, embodiments within the scope of one or more claims may additionally, or alternatively, provide one or more advantages not specifically enumerated herein. Finally, to the extent that possible advantages are enumerated herein, those may be present in one or more embodiments in any combination.

At least some embodiments of the invention may provide read-write access to 'read only' data, such as backed up data for example, in such a way that the necessary read and write operations can be performed without modifying or compromising the 'read only' data in any material way, or at all. As well, some embodiments of the invention may enable a determination to be made as to whether a prior write operation affects a read operation, even if the offset of a write block of that write operation does not fall within the limits defined by the read operation.

A. Example Operating Environments

FIGS. 1a-1d disclose example configurations and environments of embodiments of the invention, such as example operating environment 100. The environment 100 may be a network such as a local area network, a wide area network, or any other networked configuration. The environment 100 may include various devices including servers and other computers that are interconnected. The data stored in the system and/or the software operating the environment 100 may be cloud based, network based, or single computer based or combination thereof. Moreover, any combination of the elements indicated in FIGS. 1a-1d may be implemented in a cloud or internet environment or other networked environment.

As indicated in FIGS. 1a-1d, the example environment 100 includes a backup server 200 configured for communication with one or more clients 300, and one or more target machines 400. In general, backups created in connection with the backup server 200 can be restored to the client 300 and/or the target machine 400. The client 300 and/or the backup host 400 may be physical machines, virtual machines, or any other suitable type of device. Additionally, one or more hosts 500 may be present in the operating environment 100.

With particular reference first to the backup server 200 and the client 300, the backup server 200 generally operates to create, or cause the creation of, one or more backups of data that is resident at the client 300. In some implementations, the backup server 200 is an EMC Corp. AVAMAR server or NetWorker server, although the scope of the invention is not limited to those example servers. The backup server 200 operates in conjunction with a backup application 302, which is a data de-duplication application in some embodiments, of the client 300 to backup data residing on storage media 304, such as disks for example, of the client 300. The backups thus created, which comprise de-duplicated backups in some embodiments, are stored on the storage media 202 of the backup server 200. The backups may be restored to the client 300 and/or to storage media 402 of the target machine 400, and/or to any other machines.

As noted above, the environment 100 may include one or more hosts 500. The number of hosts 500 in the environment 100 can vary, and the hosts can be of different types. In one example, one or more hosts 500 may all be part of the same network or associated with the same entity. The one or more hosts 500 can include, by way of example only, servers (e.g., a file server, an email server), computers (e.g., desktop computers, laptop computers, tablet devices, smartphones), virtual machines, databases, or any combination thereof. Each of the one or more hosts 500 can be associated with its own data. As well, a host 500 may generally be any device that includes one or more applications which require read-write access to a backup, such as the backups residing at the backup server 200. As such, the host 500 or any other device that requires read-write access to 'read only' data, which may or may not be backup data, may transmit both read and write requests concerning that 'read only' data.

In the examples of FIGS. 1a-1d, the host 500 is a machine, such as a computing device, that includes a memory 502, one or more processors 504, storage media 506, and I/O device 508, data storage 510. As well, one or more applications 512 are provided that comprise executable instructions. One or more of the target machine 400, client 300 and backup server 200 may likewise include any one or more of the aforementioned elements of example host 500, in any combination.

B. Example Abstraction Layers

With continued reference to FIGS. 1a-1d, and particular reference to FIG. 1a, the example implementation in that figure further includes an abstraction layer 600. In general, the abstraction layer 600 intercepts write requests directed to 'read only' data, such as a backup for example, and creates, or enables the creation of, one or more file object constructs, discussed in more detail elsewhere herein, that mimic the structure and content of the 'read only' data to which the write request is directed. When a 'read only' file is opened for modification, the file object construct(s) associated with the write request are modified, if necessary, to include the data blocks of the write request.

Thus, the abstraction layer, through the file object constructs, can be thought of as virtualizing 'read only' data and/or any other data whose integrity is desired to be preserved, so as to enable the originator of the write request to manipulate a representation of the 'read only' data in any desired manner, including viewing, reading, writing, and deleting, but without actually touching the actual underlying data. This functionality can be useful in a variety of circumstances. By way of illustration, this functionality allows testing to be performed with respect to the 'read only' data without any risk to the integrity of that data. Finally, and as noted elsewhere herein, the abstraction layer 600 functionality is not limited to interception of write requests. The abstraction layer 600 may also enable a user to both dismiss the write request, that is, leave the underlying 'read only' data unmodified, and to commit, that is, write, the write blocks to the underlying data with, as/if desired.

Generally, the abstraction layer 600 can be configured in any way that enables it to intercept write requests directed to 'read only' data. As such, the abstraction layer 600 is not required to reside in any particular device or location. In some instances, the 'read only' data is a backup, but that is not necessary. More generally, the abstraction layer 600 can be employed in connection with any 'read only' or 'read-write' files and systems where it is desired to be able to avoid changes to the underlying data. Other examples of 'read only' data, and associated applications, in connection with which embodiments of the invention may be employed include, but are not limited to full backups, partial backups, snapshots, mirrored copies and de-duplicated backups. In some instances, a single abstraction layer can serve multiple applications and/or 'read only' data stores while, in other instances, an abstraction layer may be employed for each of multiple different applications and/or 'read only' data stores.

The abstraction layer 600 may be controlled by the application generating the write requests and/or by the backup server that receives the write requests. Additionally, or alternatively, the abstraction layer 600 may be controlled by a host or other device on which it resides, if that host or other device is other than the backup server or the host of the application(s) issuing the write requests. The application(s) generating write requests can be virtually any application. Examples include, but are not limited to, snapshot applications, testing applications, and any other application that may require writing to 'read only' data in a backup.

In the particular example of FIG. 1a, the 'read only' backup data is located at storage 202 of the backup server 200. Thus, the abstraction layer 600 is configured to intercept write requests from the application(s) 512 directed to that backup data. Here, the abstraction layer 600 is located in the backup server 200, as indicated. As such, the operation of the abstraction layer 600 is controlled by the backup server 200. It should be noted that the abstraction layer 600 in the arrangement of FIG. 1a may intercept write requests to any number of different backups or other 'read only' data resident on the backup server 200, some or all of which may reside in storage 202 and/or other storage (not shown) associated with the backup server 200.

Figure 1B:
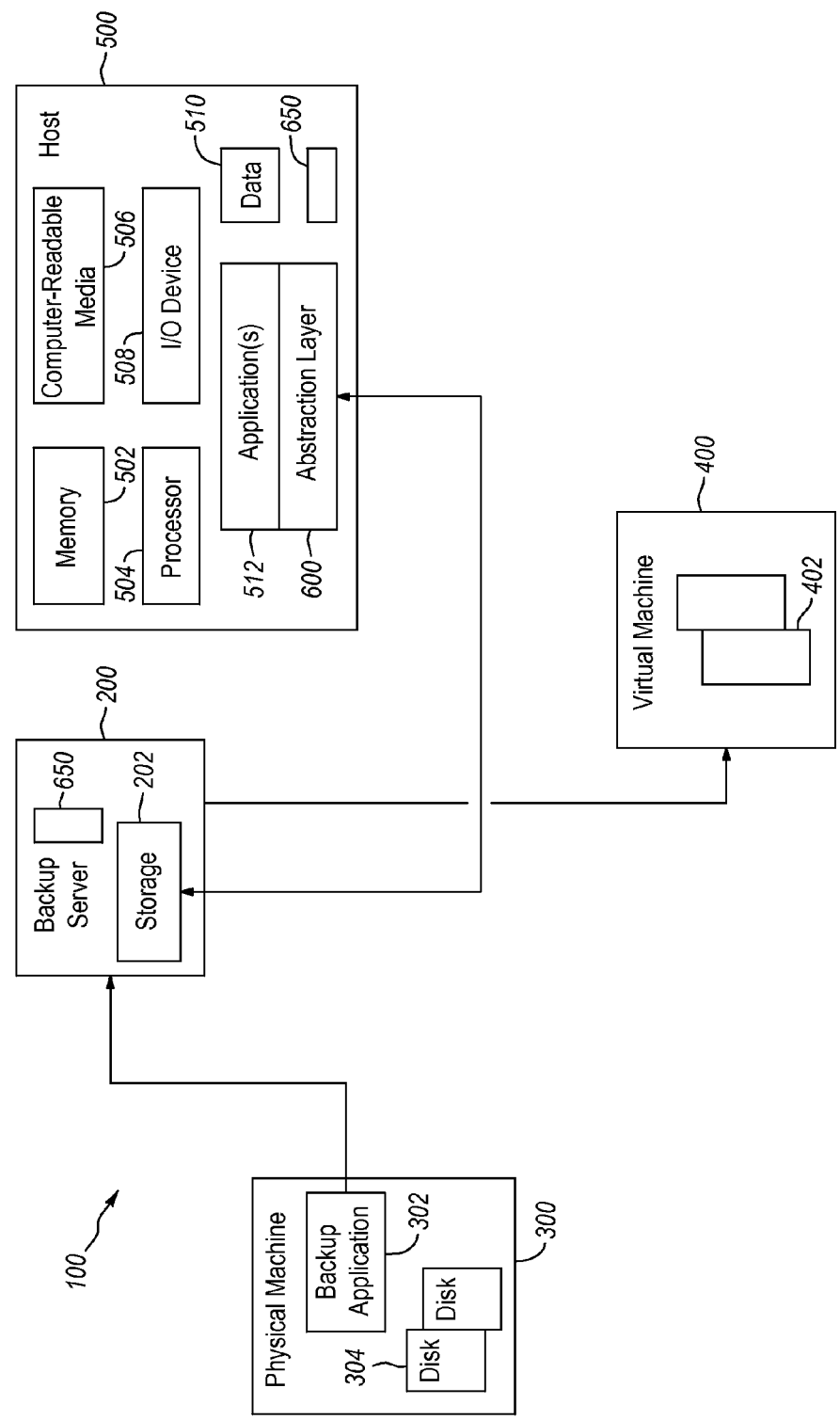

With attention now to FIG. 1b, an alternative configuration involving the abstraction layer 600 is disclosed. In this example, the abstraction layer 600 resides in the host 500 and, as such, the operation of the abstraction layer 600 is controlled by the host 500. Thus configured, the abstraction layer 600 is able to intercept write requests from the application(s) 512 directed to the backup data residing at the backup server 202. As indicated in FIG. 1b, and noted above, the abstraction layer 600 may operate in conjunction with multiple applications 512.

Figure 1C:
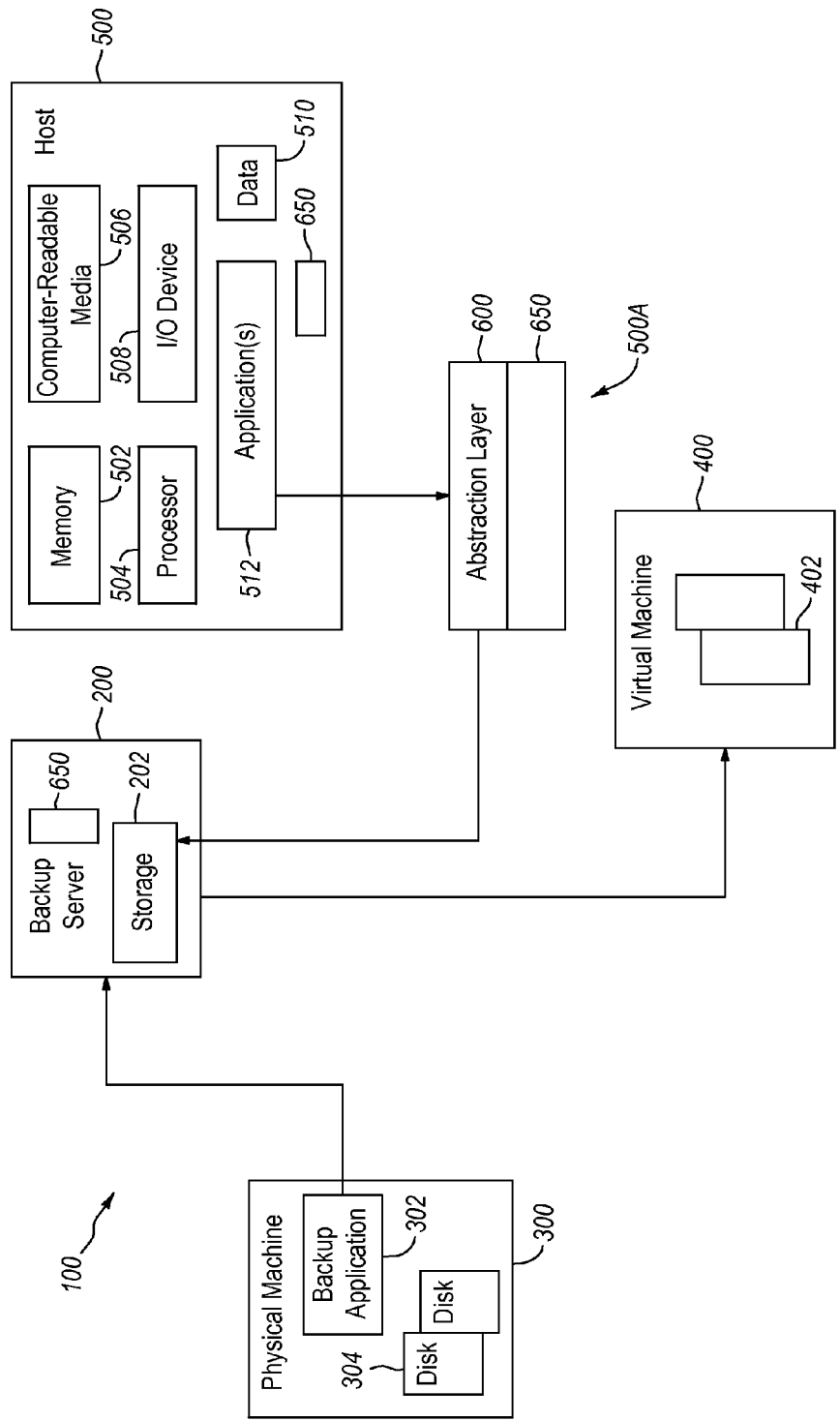

Turning now to FIG. 1c, a further alternative configuration involving the abstraction layer 600 is disclosed. In this example, the abstraction layer 600 resides neither at the backup server 200, nor the host 500, but some other location separate from the backup server 200 and the host 500. For example, the abstraction layer 600 may reside at, and by controlled by, a host 500A. As is the case with the other arrangements disclosed herein, the abstraction layer 600 may serve multiple hosts 500 and/or applications 512, in connection with one more backups stored at one or more backup servers 200.

Figure 1D:
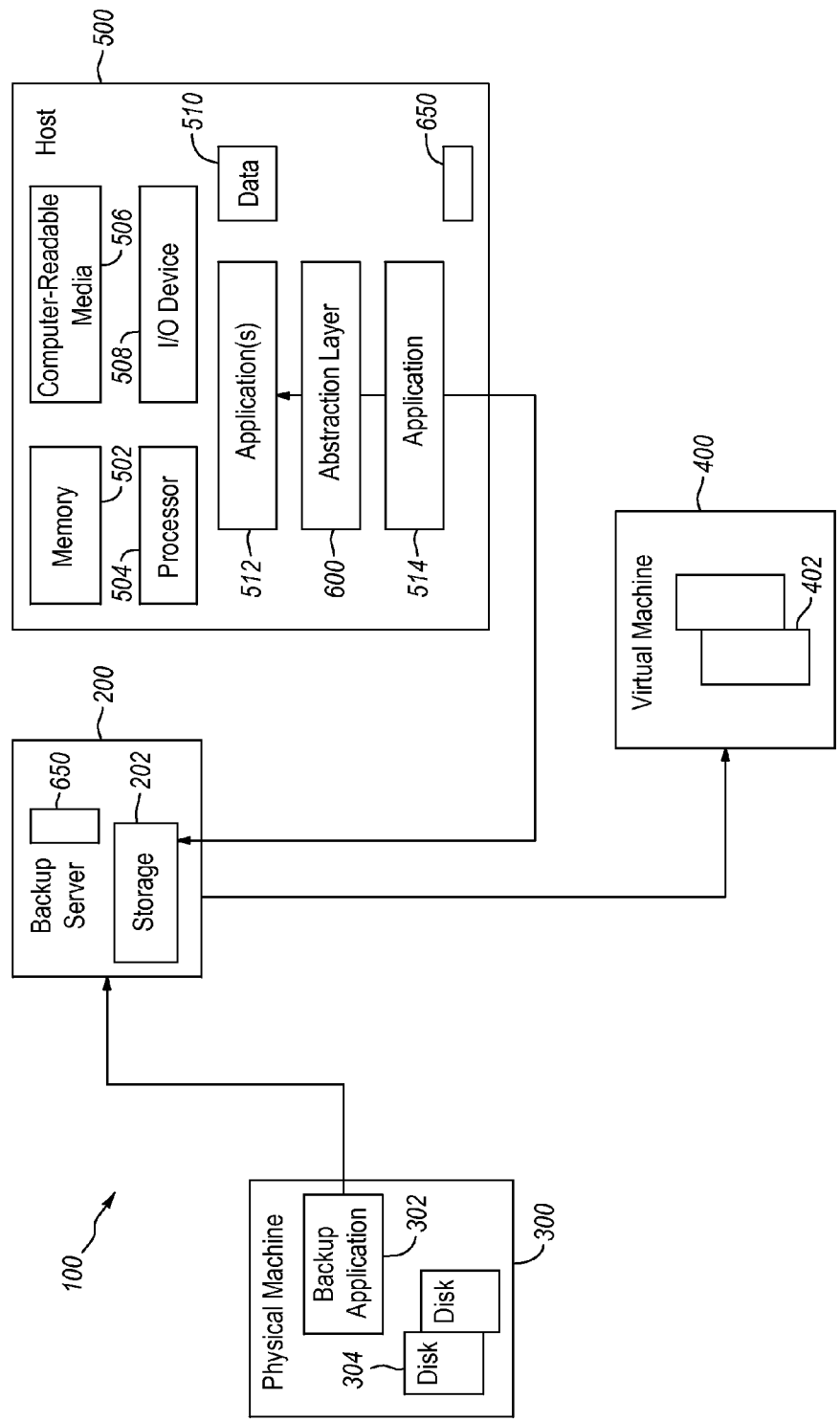

With reference finally to FIG. 1d, a further alternative configuration involving the abstraction layer 600 is disclosed. In this example, the abstraction layer 600 resides between first and second applications 512 and 514, respectively, of a host 500. In one variation of this arrangement, the application 514 resides other than at the host 500, such as the host 500A (FIG. 1c) for example, or some other location. In the arrangement of FIG. 1d, the abstraction layer 600 may intercept write requests issued by the first application 512 to the second application 514 so that the write request can be processed prior to the time that the application 514 communicates with the backup server 200. In a variation of the arrangement of FIG. 1d, both applications 512 and 514, as well as the abstraction layer 600, may be located separately from the backup server 200 and host 500.

C. File Object Constructs and Virtualized Data

Figure 2B:
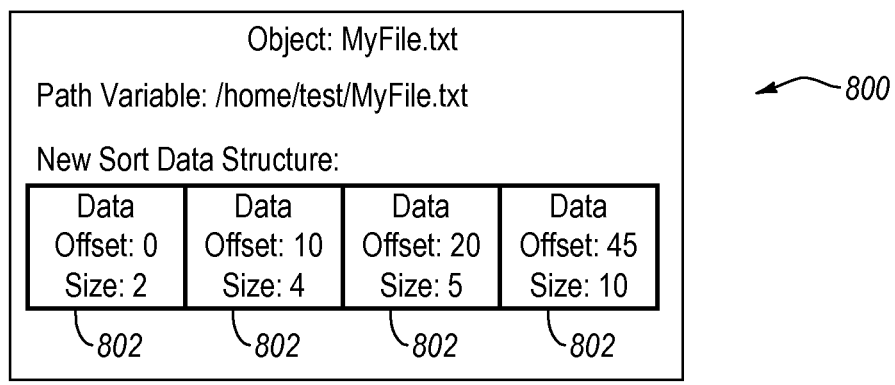
FIG. 2b discloses an example embodiment of a representation of 'read only' data that can be used to enable a write process.

As disclosed elsewhere herein, example embodiments of the abstraction layer create, or cause the creation of, a representation of stored 'read only' data, such as file 700 of FIG. 2a. In at least some embodiments, this representation is implemented as a file object construct, an example of which is disclosed in FIG. 2b. To facilitate the present discussion, the file object construct, a search tree, and hashmap are collectively designated as 650 and stored as indicated in the figures, though it should be understood that these elements need not be stored together and, rather, can be allocated in any fashion amongst any of the devices in the environment 100. Moreover, one or more of the file object construct, search tree and hashmap may persist for a period of time after being created and used, while the other(s) of the file object construct, search tree and hashmap may not be retained after use. In general, the file object construct is created by the abstraction layer upon the first requested write to the 'read only' data.

In terms of their lifespan, the file object constructs can persist even after a read request involving them has been completed. In at least some instances, one or more of the file object constructs persist for the life of a given invocation of the abstraction layer. Thus, during a particular usage period of the abstraction layer, the file object constructs are preserved so that they need not be created for subsequent writes in that particular usage period, but once the usage period is completed, the file object constructs can be flushed, thereby freeing memory space.

As noted above, the file constructs, hashmap and search tree can be stored in memory, for example, at the backup server or other device where the associated 'read only' data resides, or can be stored at the host of the application(s) that issue the write requests. By storing these elements in memory, access to the 'read only' data may proceed relatively faster than if those elements were handled differently. However, it is not required that such elements be handled this way. For example, this arrangement could be changed so that one, some or all of those elements can be saved to a file when the abstraction layer is shut down, and then read back into memory on startup of the abstraction layer, thereby restoring the last known state prior to shut down, all while leaving the underlying data intact.

With the foregoing in view, attention is directed now to an example file 700 and associated file object construct 800, disclosed in FIGS. 2a and 2b, respectively. As indicated in FIG. 2a, the file 700 includes one or more data blocks 702, each of which is uniquely identified by its offset "X," namely, the distance from the start of the data block 702 to a reference "R" of the file 700. Each data block 702 additionally has a size "S" which can be expressed, for example, in terms of bytes. Thus, when a write to file 700 is specified, the location of the data blocks 702 to be written to the file object construct 800 can be determined by referring to the respective offset associated with each data block 702 of the write request. As well, the relationship between the write data block 702 and data blocks 802 already present in the file object construct 800 can be considered and determined in terms of the size and offset of each data block.

It was noted earlier that each data block of a write request includes or is associated with a respective payload. Typically, although it is not necessarily the case, the data block payloads are stored apart from the file object construct 800. For example, the data block payloads can be stored in memory at the server or other device where the 'read only' data resides, or the data block payloads can be stored at the host of the application that issues the write request, or the data block payloads can be stored in any other suitable location.

Turning now to FIG. 2b, the file object construct 800 with its data blocks 802 serves as a representation of the underlying 'read only' data 702 of the file 700. The file object construct 800 can represent all, or only a portion, of the file 700. In general, the file object construct 800 can be modified with write requests, without disturbing the underlying data 702 of the file 700. As further indicated in FIG. 2b, the file object construct 800 may have any suitable name, such as 'MyFile.txt' for example, and can be uniquely identified by its full path, for example. In the example of FIG. 2b, the full path of the file object construct 800 is '/home/test/MyFile.txt.' Finally, the file object construct 800 is configured in such a way that successive data blocks 802 are positioned adjacent to each other, notwithstanding that their different offsets and sizes could result in overlap if the blocks 702 of the actual file 700 were positioned in that way on the storage media.

D. File Object Construct with Write and Read Blocks

With reference now to FIG. 3, details are provided concerning an example file 900, a representation, such as a file object construct 900A, of the file 900, and example read and write operations relating to that file object construct 900A and file 900. As indicated in FIG. 3, an example file 900 named 'MyFile.txt.' resides on storage media, such as a disk for example. The file 900 includes one or more data blocks 902. Each of the data blocks 902 includes or is otherwise associated with, an identifier that is unique to that data block 902. One example of such a unique identifier is the offset, or distance between the start of the block and a reference 'R' in the file 900. Thus, the data block 902 with an offset of 0 begins at 'R.' The end of that data block 902 can be determined with reference to the size of the data block, 2 in this case. Thus, the data block 902 having offset 0 and size 2 starts at offset 0 and ends at offset 2. In similar fashion, the other data blocks 902 each have a size and are associated with a particular offset. As noted in the figure, the data blocks 902 residing on the storage media are not necessarily contiguous with each other.

As further indicated in FIG. 3, the file object construct 900A includes data blocks 902A. That is, the file object construct 900A serves as a representation of the underlying 'read only' data 902 of the file 900. In the example of FIG. 3, the data blocks 902A of the file object construct 900A each correspond to a respective data block 902 of the file 900. The file object construct 900A can represent all, or only a portion, of the file 900. In general, the file object construct 900A can be modified with write requests, without disturbing the underlying data 902 of the file 900.

Consistent with the file 900 which it represents, the file object construct 900A may have any suitable name, such as 'MyFile.txt' for example, and can be uniquely identified, such as by its full path for example. In the example of FIG. 3, the full path of the file object construct 900A is '/home/test/MyFile.txt.' Finally, the file object construct 900A is configured in such a way that successive data blocks 902A are positioned contiguously to each other, notwithstanding that their different respective offsets and sizes could result in overlap if the data blocks 902 of the actual file 900 were positioned in that way on the storage media.

E. Example Write Blocks and Read Operations

With continued reference to FIG. 3, details are now provided concerning aspects of some example read and write operations relating to the file 900 and corresponding file object construct 900A. In general, it may be desirable to determine whether a prior write operation affects a subsequent read operation, even if the offset of a write block of that write operation does not fall within the limits of the read operation.

More specifically, if a read operation is requested with respect to a file, such as file 900 for example, it must be determined if a write occurred anywhere between the start (offset) and end (offset+size) of the requested read operation in order to ensure that data modified on one or more previous writes is retrieved in connection with the read request. As suggested by the foregoing, the offset of a read request is one way to define the start of the read request, and the offset+size of the read request is one way to define the end of the read request. In similar fashion, the a data block is one way to define the start of that data block, and the offset+size of the data block is one way to define the end of that data block. Thus, while the discussion herein may refer to use of an offset, any other means for defining the start and end of a data block and/or read request may alternately be used.

To continue, it is generally not adequate to simply search for the offset corresponding to the start of the read operation because of the possibility that while there may be no block that begins at that same offset, there may be a block that begins at a smaller offset and extends beyond the read operation. This notion is illustrated by the file object construct 900 appearing at the bottom of FIG. 3.

In particular, a read request 904 has been made with respect to file 900. The example read request 904 has an offset of 12, and a size of 10. As indicated by the file 900, there is no data block with an offset of 12.

However, the immediately preceding data, that is, the data block 902START immediately preceding the offset of the read request 904, has an offset of 10 and a size of 14. It can be seen that, by virtue of the combination of the size and offset of that data block 902START, at least some of the data in that data block contributes to the read request 904. That is, the block 902START that extends from offset 10 to offset 14 overlaps with the read request 904, which begins at offset 12 and extends to offset 22.

Thus, a read operation performed in response to read request 904 that did not read out the data block 902START immediately preceding the offset of the read request 904 would fail to completely satisfy the read request, since 2 bytes of data needed for the read operation 904 occur prior to the offset of the read request 904. Accordingly, in order to fully satisfy the parameters of the read request 904, the data block 902START should be read out. This approach will ensure that even if there is no data block whose start corresponds exactly to the start of the read request 904, any data block whose start occurs prior to the start of the read request 904, and whose size is such that the data block extends past the boundary of the read request 904, will be read out. As explained below, this same logic applies to a data, such as data block 902END, modified on one or more previous writes and occurring near the end of the read request 904.

As further indicated in FIG. 3, it is generally not adequate to simply search for the offset corresponding to the end of the read request 904 because of the possibility that while there may be no block that begins at that same offset, there may be a block whose offset occurs prior to the end of the read request 904 and which extends beyond the end of the read request 904. That is, there may be a data block that overlaps the read request 904 and which, accordingly, should be read out in connection with the read request 904, even though the entirety of that data block is not within the boundary of the read request 904. Put another way, since the blocks are sorted by offset, the next block also contains data that may be occurring at the tail end of the read request 904.

In particular, and as indicated in FIG. 3, data block 902END has an offset of 20 and a size of 5. That is, data block 902END ends at offset 25. Because the read request 904 has an offset of 12 and a size of 10, the read request 904 ends at offset 22, thereby overlapping with data block 902END. Thus, a read operation performed in response to read request 904 that did not read out the data block 902END whose offset occurs prior to the end of the read request 904 and which extends beyond the boundary of the read request 904 would fail to completely satisfy the read request, since 2 bytes of needed data reside in data block 902END whose end extends beyond the end of the read request 904.

Accordingly, in order to fully satisfy the parameters of the read operation 904, the data block 902END should be read out. This approach will ensure that even if there is no data block whose offset corresponds exactly to the end of the read request 904, any data block whose offset occurs prior to the end of the read request 904, and whose size is such that the data block extends past the boundary of the read request 904, will be read out.

F. Example Search Methods

As discussed above, a search process may be performed in connection with a read request and/or read operation in order to provide a level of assurance that all previously written data blocks implicated by the read operation are returned, even if one or more of those data blocks has an offset that does not exactly correspond to an offset or end of the read operation.

In brief, one example of such a search process can be summarized as taking the following if/then approach: (i) if a data block exists which has an offset (or key) that is the same as the offset/end (as applicable) of the read operation, return that write block; otherwise, (ii) return the data block whose offset immediately precedes the offset/end (as applicable) of the read operation.

The search process described above can be expressed as a binary Search algorithm with O(n *log n) speed thus:

```
while(iFirst<=iLast)
{
   iMid=(iFirst+iLast)/2;
   pData=(*m_vData)[iMid];
   if(uiOffset>pData→GetOffset( ))
   {
      iFirst=iMid+1;
   }
   else if(uiOffset<pData→GetOffset( ))
   {
      iLast=iMid-1;
   }
   else
   {
      bFound=true;
      break;
   }
}
if(!bFound)
{
   --iMid; //this gives us the previous modified block
}
```

This approach yields the previous modified block, notwithstanding that such block may have an offset different from the offset/end of the read operation.

Figure 4:
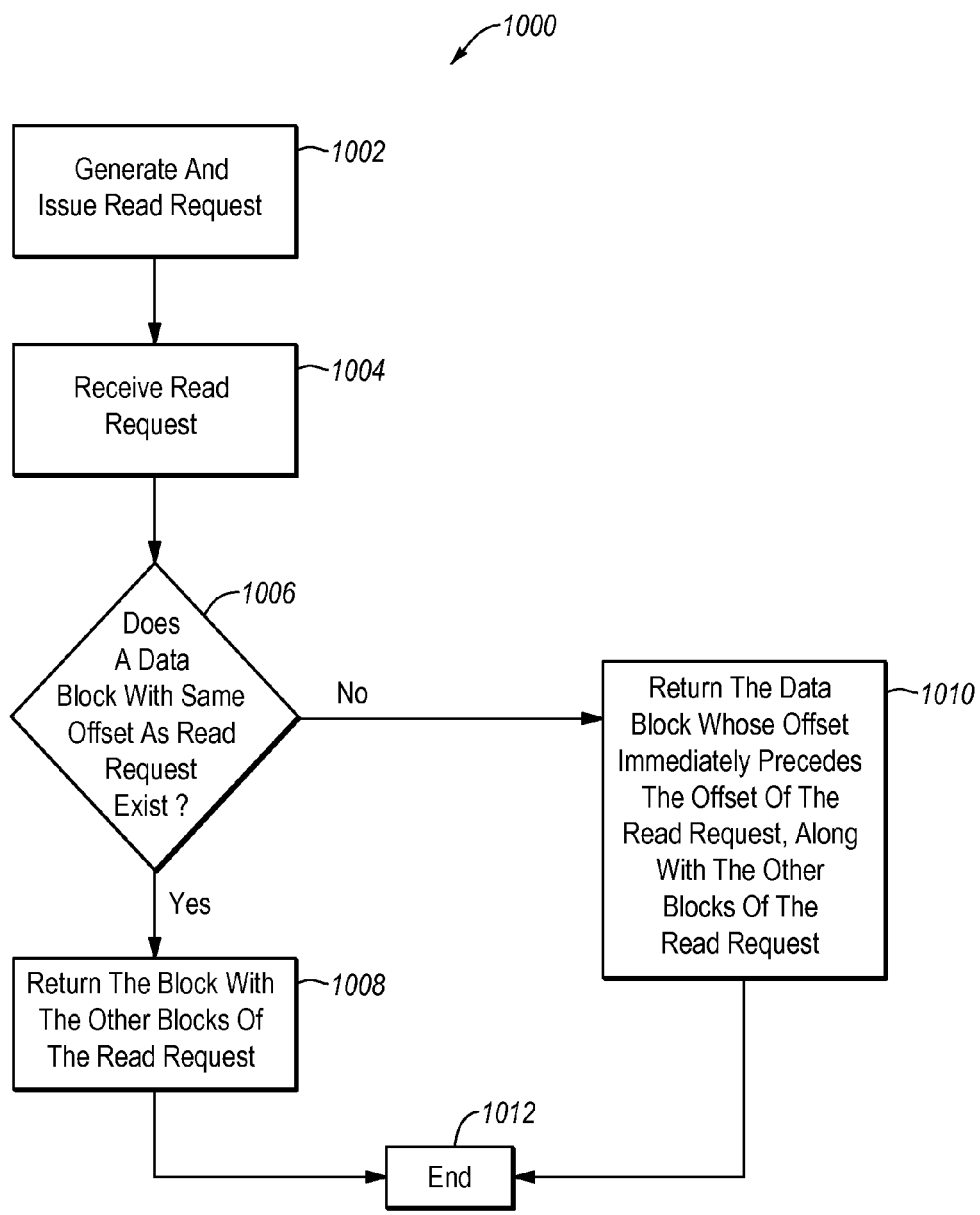
FIG. 4 discloses an example process for determining if a write process occurred in connection with data implicated by a read process that occurs subsequent to the write process.

With particular attention now to FIG. 4, details are provided concerning an example method 1000 for facilitating read access in a 'read only', or other, environment. It should be noted that the processes below can be performed by a variety of entities at various times and in various environments. Accordingly, the processes, and combinations thereof, set forth below are presented solely by way of example.

The example process 1000 begins at 1002 where a read request pertaining to a file or other data object is generated and issued, such as by an application for example. Such data objects can include, for example, files, portions of files, directories, and combinations of any of the foregoing. The read request can be directed to 'read only' data, but that is not required. More generally, the read request can be directed to any data that can be read out on request. The read request may include information, such as an offset for example, that identifies where an associated read operation should start, and the read request may also include or otherwise identify the size of the read operation. The end of the read operation can be specified, or readily derived by simply adding the size of the read operation to the offset of the read operation. The offset and/or the end of the read request may, or may not, each correspond to an offset of a respective data block. The read request may identify specific data blocks, such as by offset for example, although that is not necessary.

At 1004, the read request is received. The read request can be received, for example, by a backup server that includes a backup with which the read request is concerned. More generally however, the read request can be received, either directly or indirectly, by any entity that includes data associated with the read request. In some instances, the read request can be intercepted by an abstraction layer, although that is not required.

Once the read request has been received by the entity having the data with which the read request is concerned, the process 1000 then advances to a decision point at 1006 where the file to which the read request is directed is examined to see if a data block exists which has an offset/end that is the same as the offset/end, as applicable, of the read request.

It should be noted that the inquiry at 1006 can have at least two parts, namely, a first part where the file to which the read request is directed is examined to see if a data block exists which has an offset that is the same as the offset of the read request, and a second part where the file to which the read request is directed is examined to see if a data block exists which has an end that is the same as the end of the read request. If both parts are performed, either part can be performed first. Where only a single part is performed, either part can be performed. In the interest of simplifying the present discussion, the inquiry at 1006 will be assumed to be directed to an examination of the file for a data block with the same offset as the read request, though it should be understood that such inquiry can also take any of the forms and have any of the parts noted above.

Consistent with the foregoing, in some instances, a data block with the same offset as the read request exists, but there is no data block with the same end as the read request. In other instances, a data block with the same end as the read request exists, but there is no data block with the same offset as the read request. In still other instances, there is a data block in the file that has the same offset as the read request, and there is a data block in the file with the same end as the read request. In still further instances, exemplified in FIG. 3, there is a first data block with an offset different from that of the read request, but the first data block overlaps the read request, and there is also a second data block whose end is different from that of the read request, but the second data block overlaps the read request. More generally, any combination of the aforementioned data block configurations and arrangements is possible.

With continuing reference to FIG. 4, if it is determined at 1006 that the file or other object includes a data block having the same offset as the read request, that data block is returned 1008, to the requestor and/or an entity specified by the requestor, along with the other blocks of the read request. On the other hand, if it is determined at 1006 that the file or other object does not include a data block having the same offset as the read request, the data block whose offset immediately precedes the offset of the read operation is returned 1010, to the requestor and/or an entity specified by the requestor, along with the other blocks of the read request. As noted elsewhere herein, a similar operation can be performed with respect to a data block whose end is not the same as that of the read request but whose end is the first data block end following the end of the read request. Once the data blocks of the read request, and any overlapping data blocks, are returned to the requestor and/or an entity specified by the requestor, the process 1000 terminates 1012.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for reading data, the method comprising:
receiving a read request that is directed to a data object, the read request including an offset and an end;
examining the data object to determine if a previously written data block is present that has an offset which is the same as one of the offset or the end of the read request; and
if there is no previously written data block present which has the same offset or end as the read request, returning a previously written data block whose offset immediately precedes one of the offset or the end of the read request.

2. The method as recited in claim 1, wherein the data object is a 'read only' file.

3. The method as recited in claim 1, wherein the read request is associated with an application.

4. The method as recited in claim 1, wherein a data block whose offset immediately precedes the offset or the end of the read request overlaps the read request such that a portion of that data block resides outside a boundary of the read request.

5. The method as recited in claim 1, wherein returning a previously written data block whose offset immediately precedes one of the offset or the end of the read request comprises returning a previously written data block whose offset immediately precedes the offset of the read request, and the method further comprises:
returning a previously written data block whose offset immediately precedes the end of the read request.

6. The method as recited in claim 1, wherein the data object is a portion of a backup.

7. The method as recited in claim 1, wherein the read request is received at a backup server.

8. A non-transitory physical storage device having stored therein computer-executable instructions which, when executed by one or more hardware processors of a computing system, facilitate reading of data, wherein facilitating the reading of data comprises:

receiving a read request that is directed to a data object, the read request including an offset and an end;

examining the data object to determine if a previously written data block is present that has an offset which is the same as one of the offset or the end of the read request; and if there is no previously written data block present which has the same offset or end as the read request, returning a previously written data block whose offset immediately precedes one of the offset or the end of the read request.

9. The physical storage device as recited in claim 8, wherein the data object is a 'read only' file.

10. The physical storage device as recited in claim 8, wherein the read request is associated with an application.

11. The physical storage device as recited in claim 8, wherein a data block whose offset immediately precedes the offset or the end of the read request overlaps the read request such that a portion of that data block resides outside a boundary of the read request.

12. The physical storage device as recited in claim 8, wherein returning a previously written data block whose offset immediately precedes one of the offset or the end of the read request comprises returning a previously written data block whose offset immediately precedes the offset of the read request, and the method further comprises:

returning a previously written data block whose offset immediately precedes the end of the read request.

13. The physical storage device as recited in claim 8, wherein the data object is a portion of a backup.

14. The physical storage device as recited in claim 8, wherein the read request is received at a backup server.

15. A backup server, comprising:

a backup application;

one or more hardware processors;

data storage holding backup data; and computer-executable instructions which, when executed by one or more of the hardware processors, facilitate reading of data, wherein facilitating the reading of data comprises:

receiving a read request that is directed to a data object, the read request including an offset and an end;

examining the data object to determine if a previously written data block is present that has an offset which is the same as one of the offset or the end of the read request; and if there is no previously written data block present which has the same offset or end as the read request, returning a previously written data block whose offset immediately precedes one of the offset or the end of the read request.

16. The backup server as recited in claim 15, wherein the data object is a 'read only' file.

17. The backup server as recited in claim 15, wherein the read request is associated with an application.

18. The backup server as recited in claim 15, wherein a data block whose offset immediately precedes the offset or the end of the read request overlaps the read request such that a portion of that data block resides outside a boundary of the read request.

19. The backup server as recited in claim 15, wherein returning a previously written data block whose offset immediately precedes one of the offset or the end of the read request comprises returning a previously written data block whose offset immediately precedes the offset of the read request, and the method further comprises:

returning a previously written data block whose offset immediately precedes the end of the read request.

20. The backup server as recited in claim 15, wherein the data object is a portion of the backup data.

\* \* \* \* \*